Figure 1:
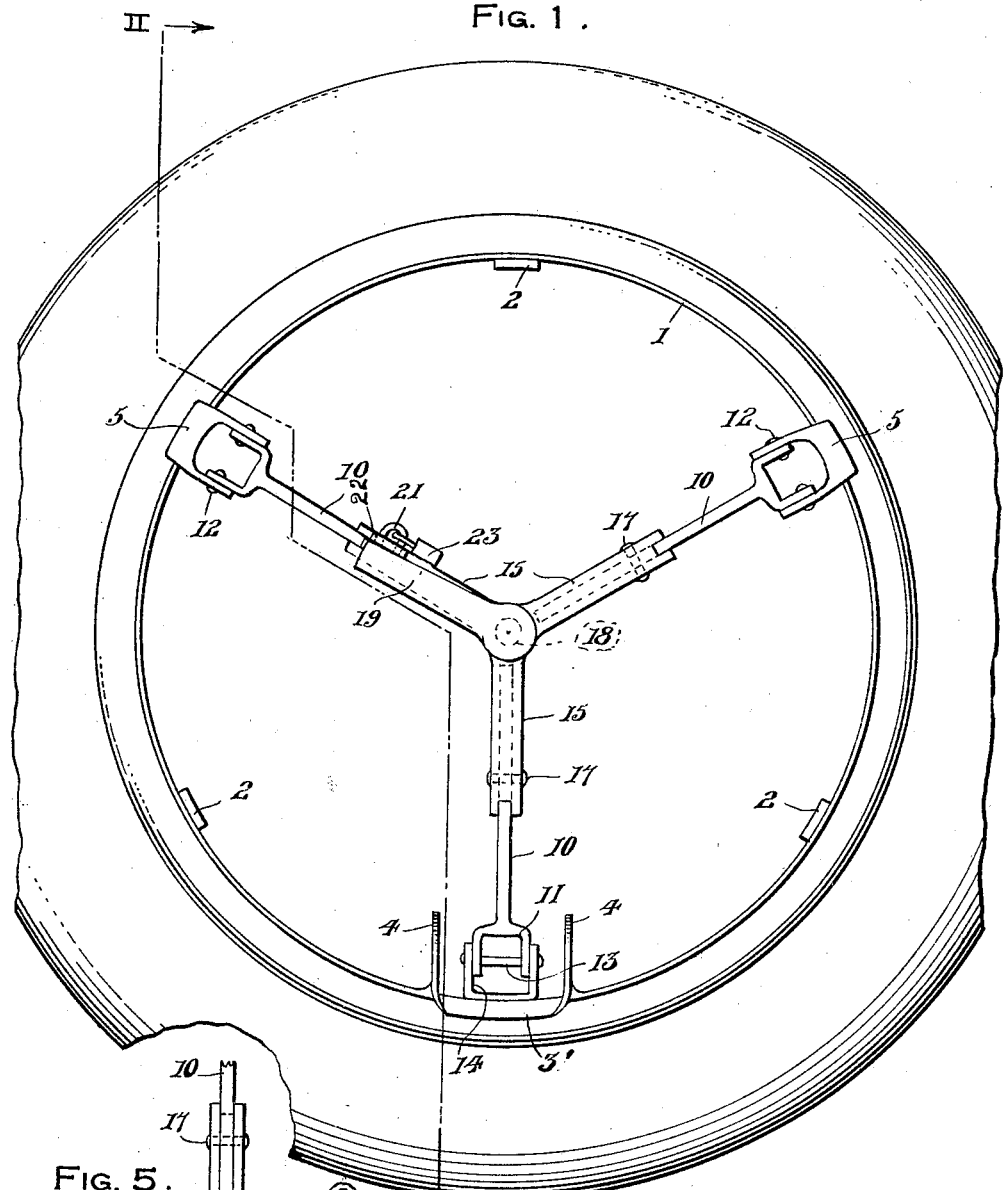

S. RYMOWICZ.
TIRE CARRIER.
APPLICATION FILED JULY 22, 1920.

1,380,420.

Patented June 7, 1921.
2 SHEETS—SHEET 1.

Inventor
S. Rymowicz

By A. M. Wilson
Attorney

S. RYMOWICZ.
TIRE CARRIER.
APPLICATION FILED JULY 22, 1920.

1,380,420.

Patented June 7, 1921.
2 SHEETS—SHEET 2.

Inventor
S. Rymowicz
By A. W. Wilson
Attorney

UNITED STATES PATENT OFFICE.

STEFAN RYMOWICZ, OF KENOSHA, WISCONSIN.

TIRE-CARRIER.

1,380,420.　　　　Specification of Letters Patent.　　Patented June 7, 1921.

Application filed July 22, 1920. Serial No. 398,145.

*To all whom it may concern:*

Be it known that I, STEFAN RYMOWICZ, a citizen of Lithuania, residing at Kenosha, in the county of Kenosha and State of Wisconsin, have invented certain new and useful Improvements in Tire-Carriers, of which the following is a specification.

This invention relates to certain new and useful improvements in tire carriers for automobiles and has for its primary object to secure a spare or emergency tire and rim upon a carrier frame that is attached to a convenient part of an automobile, such as in the rear thereof.

A further object of the invention resides in the provision of a spare tire carrier for automobiles wherein lateral arms are carried by a fixed rim for supporting the tire and rim at a point outwardly of the fixed rim.

A still further object of the invention is to provide a spare tire embodying a plurality of arms for supporting the same that project laterally of a mounting rim, some of which arms are pivotally mounted with their outer free ends moving toward the central axis of the carrier to permit a removal of a spare tire and rim from the holder, novel locking devices for the lateral arms being provided for holding the arms in a tire supporting position.

With the above and other objects in view, the present invention consists in the novel form, combination and arrangement of parts hereinafter more fully described in connection with the accompanying drawings, wherein like reference characters indicate similar parts throughout the several views.

Figure 5:
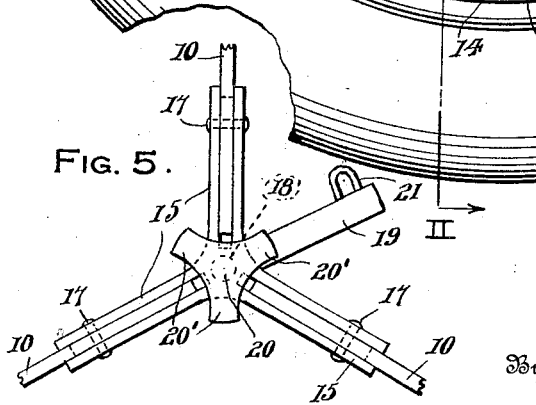
Figure 2:
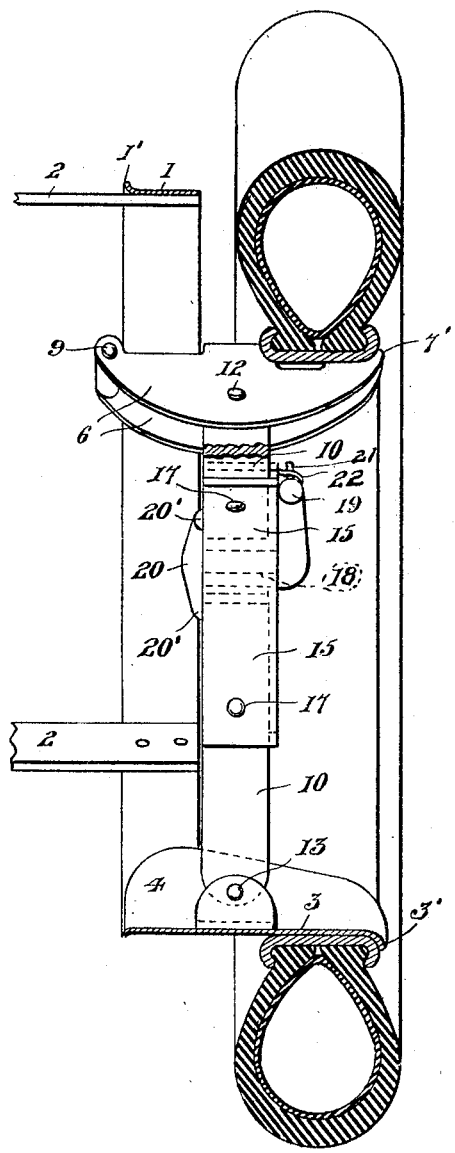
Figure 3:
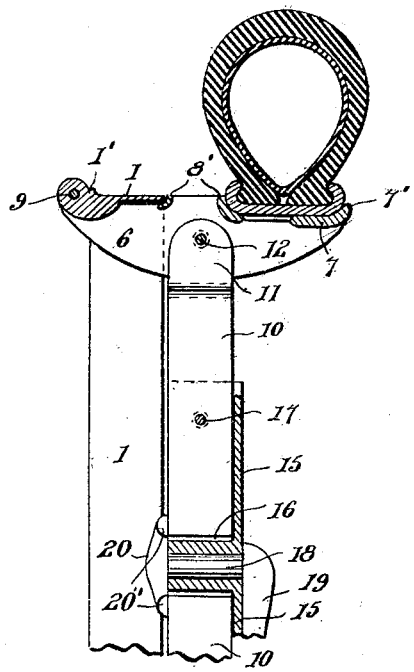
Figure 4:
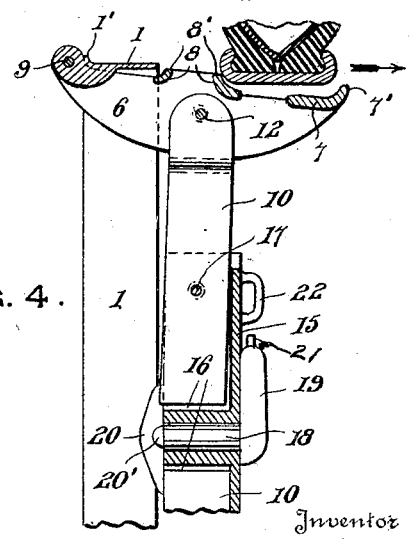

In the drawings,

Figure 1 is a side elevational view, of a spare tire carrier constructed in accordance with the present invention, with a tire and rim supported thereon with the tire partially broken away, Fig. 2 is a vertical sectional view taken on line II—II of Fig. 1, Fig. 3 is a fragmentary sectional view showing the tire supporting arms locked in their supporting position, Fig. 4 is a detail sectional view similar to Fig. 3 showing the tire supporting arms moved to a position to permit the removal of a tire therefrom and Fig. 5 is a fragmentary elevational view of the central frame construction of the carrier.

Referring more in detail to the accompanying drawings, there is illustrated a tire carrier designed for attachment to an automobile embodying an annular band section 1 carrying supporting brackets 2 by which the band is attached to an automobile, preferably to the rear portion thereof. As shown in Figs. 2 to 4, the inner edge of the band 1 is curved as at 1' to provide an inward limiting stop for a spare tire and rim supported on the band 1.

To provide for the supporting of an additional spare tire and rim, lateral arms project from the annular band 1, one of the arms extending from the lower side thereof as shown in Figs. 1 and 2 and preferably constitute an integral part of the construction, said part being designated by the numeral 3 having a central plane surface and inwardly directed parallel side walls 4 while the outer edge of the arm 3 is curved outwardly as at 3' to provide an outward limiting stop for a spare tire and rim.

The two supporting arms 5 shown in Figs. 1 to 4 are of identical construction, each arm embodying side plates 6 curved at their inner edges and connected at the outer portions thereof by the transverse bar 7 and the intermediate spaced transverse bars 8, the outer edge of the transverse bar 7 being outwardly curved as at 7' while the inner edges of the transverse bars 8 are curved outwardly as at 8' to provide limiting stops for the tires and rims supported thereon. The supporting arms 5 extend inwardly of the annular band 1 and are pivotally mounted at their inner ends upon the pins 9 carried by the band.

To provide for an outward projection of the supporting arms 5 with the rigidly mounted arm 3 as an abutment therefor, there is provided for each bracket arm 3 and 5 a lever 10 forked at its outer end as at 11 for pivotal attachment to the side walls 6 of the brackets 5 by the pivot pins 12, the lever 10 associated with the arm 3 having the bifurcated end 11 thereof pivotally mounted upon the pin 13 carried by the U-shaped bracket 14 upon the inner face of the bracket arm 3 as clearly shown in Figs. 1 and 2. The support and locking brace for the levers 10 is shown in detail in Fig. 5 and embodies three radially projecting legs 15 projecting from a central bearing 16, the legs being U-shaped in cross section as illustrated with the levers 10 extending thereinto and pivotally mounted upon the pins 17, the outer side edges of the levers 10 being slightly spaced from the closed sides of the legs to permit a pivotal movement of the levers. A shaft 18 is journaled in the bearing 16 and is provided upon the outer end thereof with a handle 19, the inner end of the shaft carrying a three-cornered plate 20 with the corner legs 20' thereof adapted to extend over the open sides of the U-shaped legs 15 for engagement with the adjacent edges of the lever 10 to permit pivotal movement of the levers upon the pins 17. When this position is obtained, the link 21 carried by the outer end of the arm 19 projects through the keeper 22 on one of the legs as shown in Figs. 1 and 2 and to which a lock 23 is attached, it being noted from an inspection of Fig. 5 that the shifting lever 19 for the locking plate 20 is alined with one of the corner legs 20' so that when the lever 19 is locked to the keeper 22 carried by one of the legs the open sides of the U-shaped legs will be closed by the plate 20.

Assuming that a spare tire and rim as shown in Figs. 1 and 2 are in position on the supporting arms 3 and 5, the tire rim is engaged at its outer side by the curved ends 3' and 7' of the arms 3 and 5 respectively, while the inner side of the rim is engaged by the upwardly curved ends 8' of the intermediate cross bars 8 of the arm 5. When so positioned, the levers 10 have their inner ends confined within the U-shaped legs 15 by the clamping plate 20 by shifting the lever arm 19 and the bearing shaft 18 the plate 20 is disposed as shown in Fig. 5 to displace the corner legs 20' from the frame legs 15 and by pressing inwardly upon the central bearing 16 of the clamping frame, the levers 10 will be moved upon their pivot pin 17 with the inner ends of the levers 10 projected through the open sides of the legs 15, thus moving the outer ends of the tire supporting arms 5 inwardly on their pivot pins 12 whereupon the tire and rim supported thereon as shown in Fig. 4 may be readily removed. A reverse operation of the clamping frame as by moving the same outwardly to shift the inner ends of the levers 10 within the legs 15, the supporting arms 5 are again moved outwardly and the rotation of the shaft 18 by the arm 19 causes the plate legs 20' to overlie the inner ends of the U-shaped legs 15 to prevent movement of the levers 10 therein. It will therefore be seen that upon a slight pivotal movement of the supporting arms 5, a tire and rim may be easily and quickly mounted on the carrier and as readily removed therefrom, with the levers 10 holding the arms 5 outwardly positioned and thus locked by the plate 20, the spare tire and rim is rigidly mounted on the carrier and is entirely free of contact therefrom.

While there is herein shown and described the preferred embodiment of the invention, it is nevertheless to be understood that minor changes may be made therein without departing from the spirit and scope of the invention.

What is claimed as new is:

1. A tire carrier comprising a supporting band, supporting arms carried by said band, some of said arms being movable relative thereto, levers pivotally attached to said arms and a locking frame pivoted to all of said levers, and means coöperating with the locking frame adapted to hold the levers immovable with the supporting arms rigidly positioned.

2. A tire carrier comprising a supporting band, supporting arms carried by said band, some of said arms being movable relative thereto, levers pivotally attached to said arms, a locking frame having the levers pivoted thereto and means carried by the locking frame for holding the levers immovable with the supporting arms rigidly positioned.

3. A tire carrier comprising a supporting band, supporting arms carried by said band, some of said arms being movable relative thereto, levers pivotally attached to said arms, a locking frame having the levers pivoted thereto, a shaft journaled in said locking frame and means carried by said shaft adapted to engage the inner ends of said levers to hold the same immovable relative to the locking frame with the supporting arms rigidly positioned.

4. A tire carrier comprising a supporting band, supporting arms carried by said band, some of said arms being movable relative thereto, levers pivotally attached to said arms, a locking frame having the levers pivoted thereto, a shaft journaled in said locking frame, means carried by said shaft adapted to engage the inner ends of said levers to hold the same immovable relative to the locking frame with the supporting arms rigidly positioned and coöperating means carried by the shaft and locking frame for holding the shaft carried means engaging the levers immovable.

5. A tire carrier comprising a supporting band, supporting arms carried thereby, some of said arms being movable relative to said band, and means arranged axially of said band and rotatable concentrically therewith and coöperating with said movable arms to hold the same rigidly positioned.

6. A tire carrier comprising a supporting band, supporting arms carried thereby, some of said arms being movable relative to said band and locking levers connected to said arms to hold the same rigidly positioned, and means concentrically rotatable relative to the band for holding the levers and arms immovable.

7. A tire carrier comprising a supporting band, supporting arms carried thereby, some of said arms being pivotally mounted for movement in a direction radially of the tire band, radial levers connected to said supporting arms, a locking frame having the levers pivoted therein and means carried by the frame and adapted to be rotated for engagement with the inner ends of the levers to hold the levers immovable relative to the frame with the supporting arms rigidly positioned.

8. A tire carrier comprising a supporting band, supporting arms carried by said band, a lever pivoted to each arm, a frame having the inner ends of the levers pivoted thereto, and constructed to permit movement of the levers only in one direction, and means carried by the frame for resisting movement of the levers in the opposite direction and to hold the arms rigid.

9. A tire carrier comprising a supporting band, supporting arms carried by said band, a lever pivoted to each arm, a frame having the inner ends of the levers pivoted thereto, and constructed to permit movement of the levers only in one direction, and means rotatably supported on said frame adapted to be rotated for engagement with the inner ends of said levers to resist movement of the levers in the opposite direction and to hold the arms rigid.

10. A tire carrier comprising a supporting band, supporting arms carried by said band, a lever pivoted to each arm, a frame having the inner ends of the levers pivoted thereto, and constructed to permit movement of the levers only in one direction, a rotatable shaft carried by the frame, and a plate having radial projections movable with the shaft and adapted to engage the inner ends of the levers for resisting movement of the levers in the opposite direction and to hold the arms rigid.

11. A tire carrier comprising a supporting band, supporting arms carried by said band, a lever pivoted to each arm, a frame having the inner ends of the levers pivoted thereto, and constructed to permit movement of the levers only in one direction, a rotatable shaft carried by the frame, a plate having radial projections movable with the shaft and adapted to engage the inner ends of the levers for resisting movement of the levers in the opposite direction and to hold the arms rigid, and coöperating means carried by the frame and shaft to hold the shaft and plate carried thereby immovable.

In testimony whereof I affix my signature.

STEFAN RYMOWICZ.